(12) United States Patent
Voreis et al.

(10) Patent No.: US 7,038,594 B2
(45) Date of Patent: May 2, 2006

(54) LED DRIVER CURRENT AMPLIFIER

(75) Inventors: Thomas L. Voreis, Noblesville, IN (US); Songnian Li, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 122 days.

(21) Appl. No.: 10/753,620

(22) Filed: Jan. 8, 2004

(65) Prior Publication Data
US 2005/0152123 A1    Jul. 14, 2005

(51) Int. Cl.
G08B 5/22    (2006.01)
(52) U.S. Cl. .......................... 340/815.45; 340/636.12; 340/636.13; 340/636.15; 315/224; 315/291
(58) Field of Classification Search .......... 340/815.45, 340/815.4, 636.12, 636.13, 636.15, 660, 340/664; 315/291, 307, 224, 276, 185 R, 315/219, 244; 363/121, 20, 98; 257/92; 327/112, 536, 534
See application file for complete search history.

(56) References Cited

U.S. PATENT DOCUMENTS

| | | | |
|---|---|---|---|
| 3,628,102 A * | 12/1971 | Jauch et al. | 361/154 |
| 5,661,645 A | 8/1997 | Hochstein et al. | 363/89 |
| 6,011,360 A | 1/2000 | Gradzki et al. | 315/244 |
| 6,144,222 A * | 11/2000 | Ho | 326/82 |
| 6,198,236 B1 | 3/2001 | O'Neill | 315/307 |
| 2001/0043113 A1 * | 11/2001 | Hoshino et al. | 327/534 |
| 2003/0025120 A1 | 2/2003 | Chang | 257/92 |
| 2003/0235062 A1 | 12/2003 | Burgyan Lajos et al. | 363/121 |

OTHER PUBLICATIONS

European Search Report dated Apr. 5, 2005.

* cited by examiner

*Primary Examiner*—Brent A. Swarthout
(74) *Attorney, Agent, or Firm*—Stefan V. Chmielewski (57) ABSTRACT

A circuit powering an electrical device based on a commanded current signal is provided. The circuit includes a linear current amplifier which sets a desired current flow. The circuit also dynamically controls a supply voltage in order to minimize power dissipation of the linear current amplifier. The circuit may also include a voltage drop measurement amplifier, a voltage shaping amplifier, and a switching power supply. The circuit is useful for controlling electrical devices requiring precise current control and minimal power dissipation, for example, driving light-emitting diodes (LEDs) that provide illumination inside the passenger compartment of a vehicle for an imaging occupant detection system.

13 Claims, 6 Drawing Sheets

LED DRIVER CURRENT AMPLIFIER

TECHNICAL BACKGROUND

The present invention relates to a circuit for powering a device, and, more particularly, to a circuit for regulating voltage and current provided to light emitting diodes.

BACKGROUND OF THE INVENTION

Occupant detection systems for the passenger compartment of vehicles often include imaging systems. Some imaging systems include light-emitting diodes (LEDs) for illuminating the passenger compartment for a camera or other imaging device. Controlling the illumination provided by LEDs enables the imaging system to more accurately detect occupant presence in the passenger compartment. LED illumination is approximately proportional to the current flowing through the LED.

Typical current amplifiers used for driving electric devices such as LEDs suffer from excess power dissipation as a result of the voltage drop across the controlling device, for example a transistor. Because current is regulated, the voltage drop varies from the maximum of the supply voltage down to the minimum when the driving transistor is saturated. Power dissipation is maximum at mid-scale, which dissipates approximately 36 watts for a typical array of LEDs having a range of 0 to 72 watts.

Current amplifiers used to drive fuel injectors and other inductive devices generally regulate current with pulse width modulation (PWM) by taking advantage of the inductance of the injector. If an inductor were added in series with an LED, the resulting ripple current would be unacceptable as the light illumination would reflect the ripple current and be captured by the imaging camera.

While it is possible to switch a current transistor on to full saturation and to have it on only for the period of illumination required by the imaging camera, such a control scheme results in an unpredictable illumination level because the current through LEDs is extremely temperature dependent. Additionally, synchronization of the LED illumination and imaging camera in the correct proportions may be difficult.

What is needed is a circuit for improved control of LEDs and other electrical devices.

SUMMARY OF THE INVENTION

The present invention relates to a circuit powering an electrical device based on a commanded current signal. The circuit includes a current amplifier which is capable of linearly regulating a desired current flow. The circuit also dynamically controls a supply voltage in order to minimize power dissipation of the transistor or other regulating device in the current amplifier. The circuit may also include a voltage drop measurement amplifier, a voltage shaping amplifier, and a switching power supply. The circuit is useful for controlling electrical devices requiring precise current control and minimal power dissipation, for example, driving light-emitting diodes (LEDs) that provide illumination inside the passenger compartment of a vehicle for an occupant detection imaging system.

Illumination by LEDs is approximately proportional to the current. Linear adjustment of the current avoids image distortion caused by banding or rippling from pulse Width modulation (PWM) or other illumination source control. Typical current amplifiers suffer from power dissipation as a result of the voltage drop across the current regulating transistor; however, dynamic control of the supply voltage based on the forward voltage drop across the LEDs minimizes power dissipation.

In the exemplary embodiment, the current amplifier includes a voltage follower having a sense resistor in series with the LEDs. The sense resistor is used in order to precisely measure and regulate the current flow to the commanded current. A voltage drop measurement amplifier, for example, a differential amplifier, provides measurement of the voltage required at the delivered commanded current. A voltage-shaping amplifier biases the measured voltage drop in order to provide a biased voltage signal for controlling the switching power supply output. The bias provides voltage shaping so that the power supply voltage is regulated to not only power the LEDs, but to also avoid saturation of the linear amplifier at the commanded current and minimize excess power dissipation because of an unnecessarily high power supply voltage.

The inventive circuit may also be used to regulate current and minimize power dissipation for other electrical devices, for example, fuel injectors for a vehicle engine and deployment squibs for controlling vehicle airbag actuation.

In one form thereof, the present invention provides a circuit for powering an electrical device based on a command signal, including a power supply having a supply voltage signal connected to the device, and a current amplifier connected to the device and capable of linearly regulating current flow through the device, the supply voltage signal being regulated by the power supply based on a device voltage measured across the device, thereby minimizing power dissipation in the current amplifier.

In another form thereof, the present invention provides a circuit, including an LED, a voltage regulator providing a supply voltage to the LED, and a current amplifier connected to the LED and capable of linearly regulating current flow through the LED.

In yet another form thereof, the present invention provides an illumination control for an imaging system, including a controller providing a command signal based on a desired illumination level, an illumination control circuit having a current amplifier receiving the command signal, and an illumination source coupled to the current amplifier, the current amplifier linearly controlling current flowing through the illumination source based on the command signal.

In still another form thereof, the present invention provides a method of controlling an LED, including the steps of determining an illumination level, determining the current flow through the LED necessary to provide the illumination level, and limiting current flow through the LED to the determined level.

BRIEF DESCRIPTION OF THE DRAWINGS

The present invention will now be described, by way of example, with reference to the accompanying drawings, in which.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention and such exemplifications are not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Figure 1:
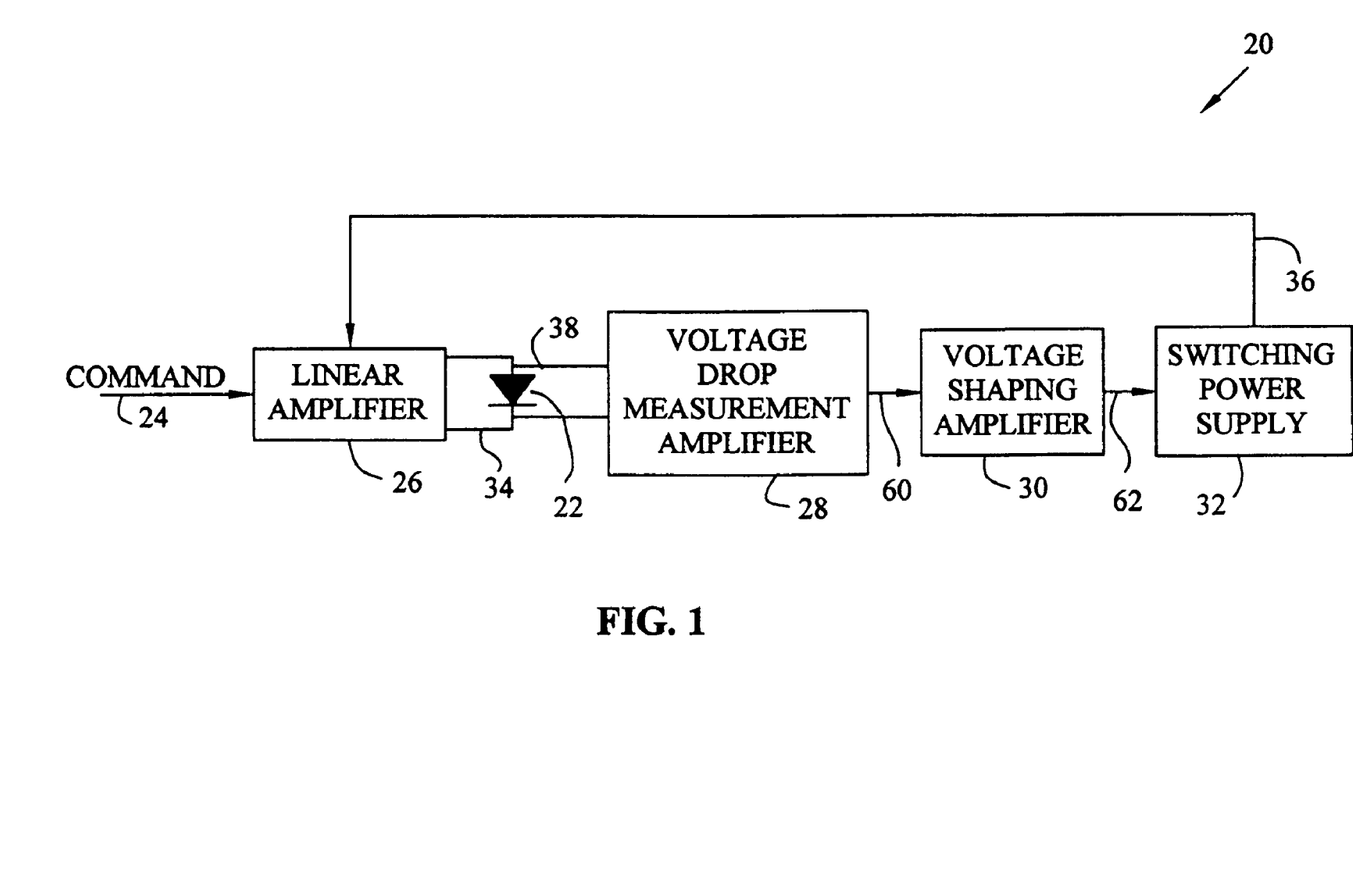
FIG. 1 is a block schematic diagram of an exemplary control circuit according to the present invention.

Referring to FIG. 1, exemplary circuit 20 provides control for an electrical device, for example, light-emitting diode (LED) 22, based on command signal 24. LED 22 may be a single LED or an array of LEDs, for example two series connected arrays of LEDs, or a video display screen having one or more matrices of LEDs. The term LED is defined to mean one or more LEDs.

Exemplary circuit 20 includes linear current amplifier 26, voltage drop measurement amplifier 28, voltage shaping amplifier 30, and switching power supply 32; however, the invention also contemplates a circuit with a subset of these elements. For example, command signal 24 may provide control for both current amplifier 26 and switching power supply 32, thereby controlling LED 22 without requiring voltage drop measurement amplifier 28 or voltage shaping amplifier 30.

Figure 6:
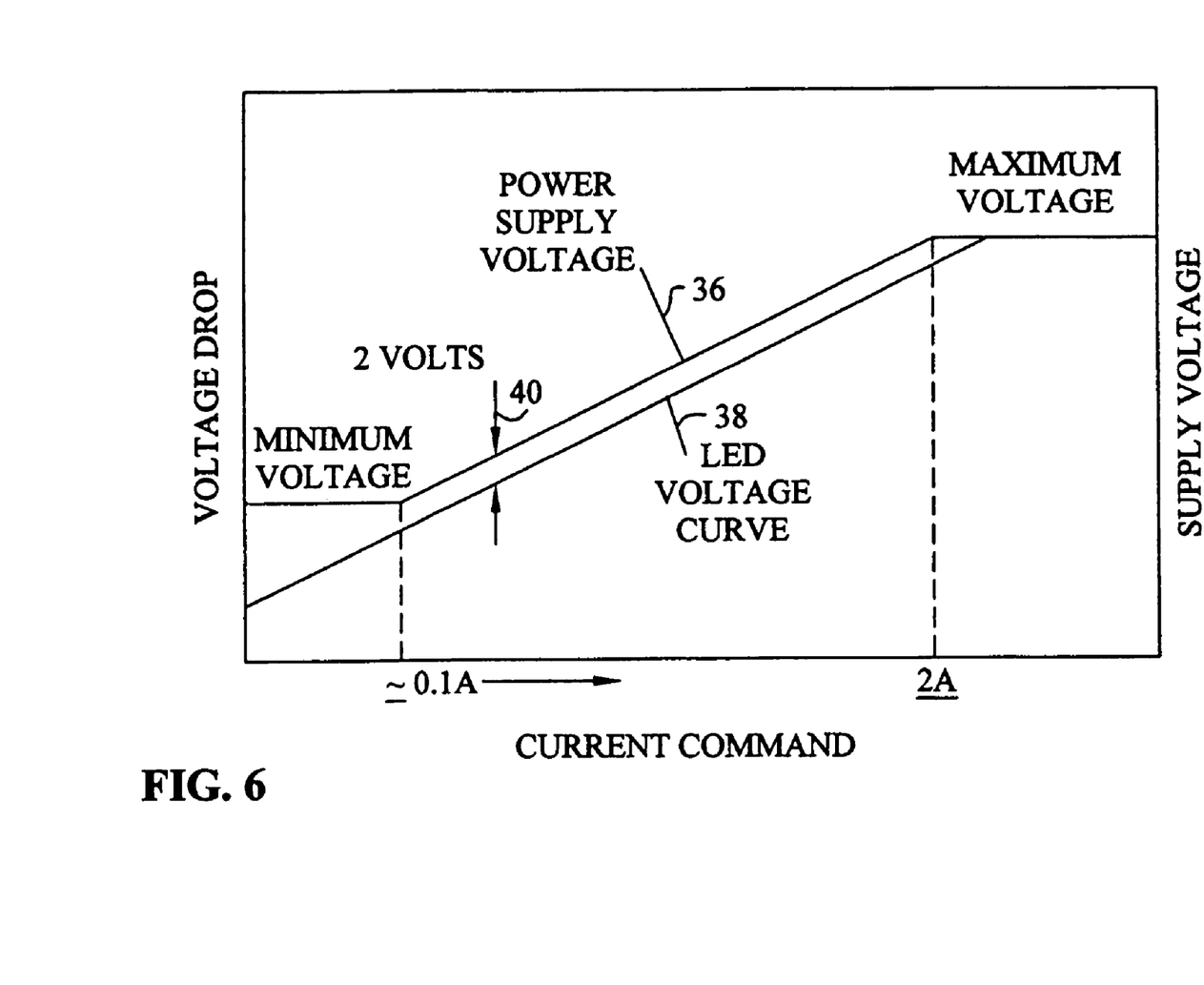
FIG. 6 is a chart illustrating electrical signals associated with the exemplary circuit shown in FIG. 1.

Current amplifier 26 advantageously provides linear control of current signal 34 flowing through LED 22. The remaining components of exemplary circuit 20 generally provide regulation of supply voltage signal 36 which is connected to and provides input to current amplifier 26 and LED 22. Specifically, supply voltage signal 36 is regulated based on device voltage 38 measured across LED 22 and predetermined bias voltage 40 (FIG. 6). Supply voltage signal 36 is set to a level that supplies device voltage 38, the voltage drop across LED 22 occurring upon application of current signal 34, and the minimum voltage drop of current amplifier 26 which ensures linear operation, i.e., current amplifier 26 components not in saturation. Regulating supply voltage signal 36 minimizes power dissipation of current amplifier 26.

Voltage drop measurement amplifier 28 may be configured essentially as a differential amplifier and provides measurement of device voltage 38, the voltage drop across LED 22. Voltage-shaping amplifier 30 biases the measured device voltage 38 in order to provide bias voltage signal 62 for controlling switching power supply 32. Alternatively, command signal 24 may include the information of bias voltage signal 62, for example by including signal data based on calculated or experimentally determined voltage drop and bias voltage signals for the various input signals provided to current amplifier 26. By including such information with command signal 24, an alternative embodiment may not require voltage drop measurement amplifier 28 and/or voltage shaping amplifier 30.

Figure 2:
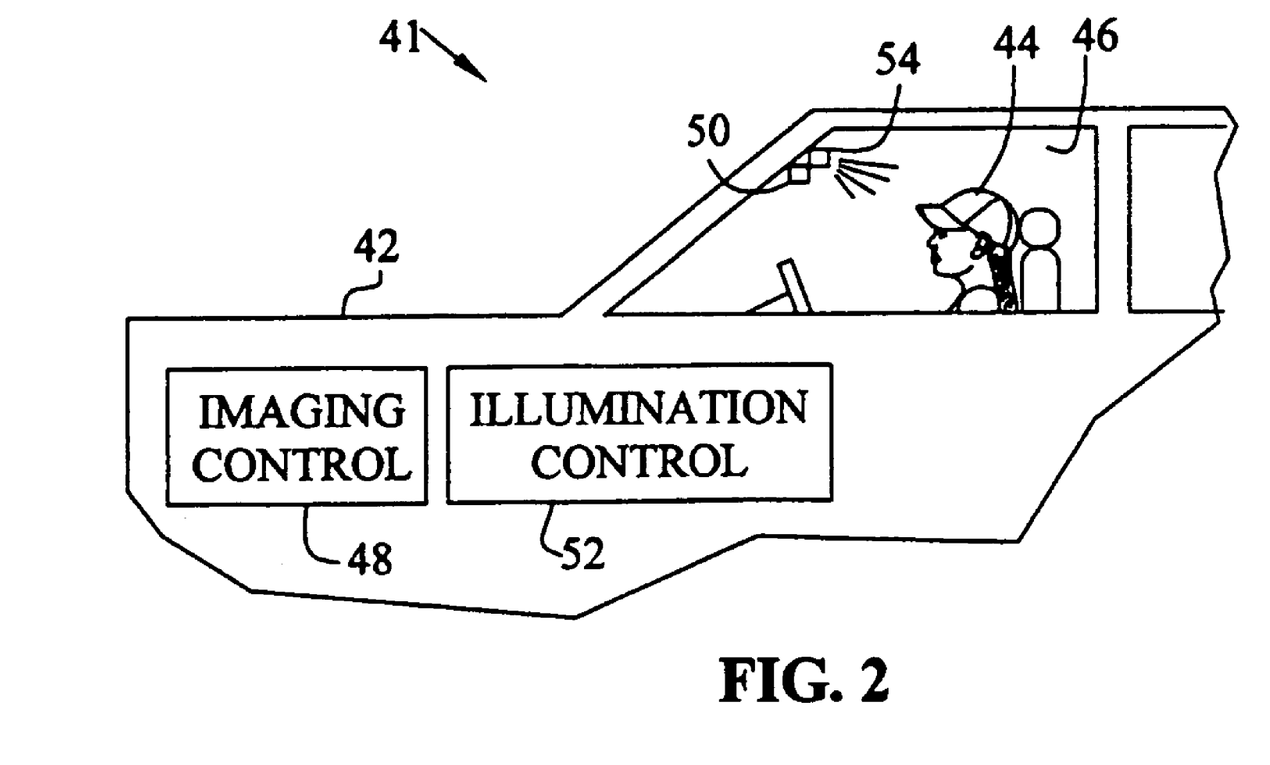
FIG. 2 is an illustration of a vehicle having an occupant detection imager which includes the exemplary circuit shown in FIG. 1.

Referring to FIG. 2, vehicle 42 includes exemplary imaging system 41 for determining the presence of occupant 44 in passenger compartment 46. Specifically, imaging system 41 may include imaging control 48, imager 50, illumination control 52 and illumination device 54. Illumination device 54 may include, for example, LED 22 (FIG. 1). In exemplary imaging system 41, imaging control 48 provides an illumination intensity and duration to illumination control 52. Illumination control 52 provides command signal 24 (FIG. 1) to, for example, exemplary circuit 20 (FIG. 1). Illumination device 54, which includes, for example, LED 22, provides the specified illumination level and duration required for passenger compartment 46 so that imager 50 may capture an image for detection of occupant 44.

Figure 3:
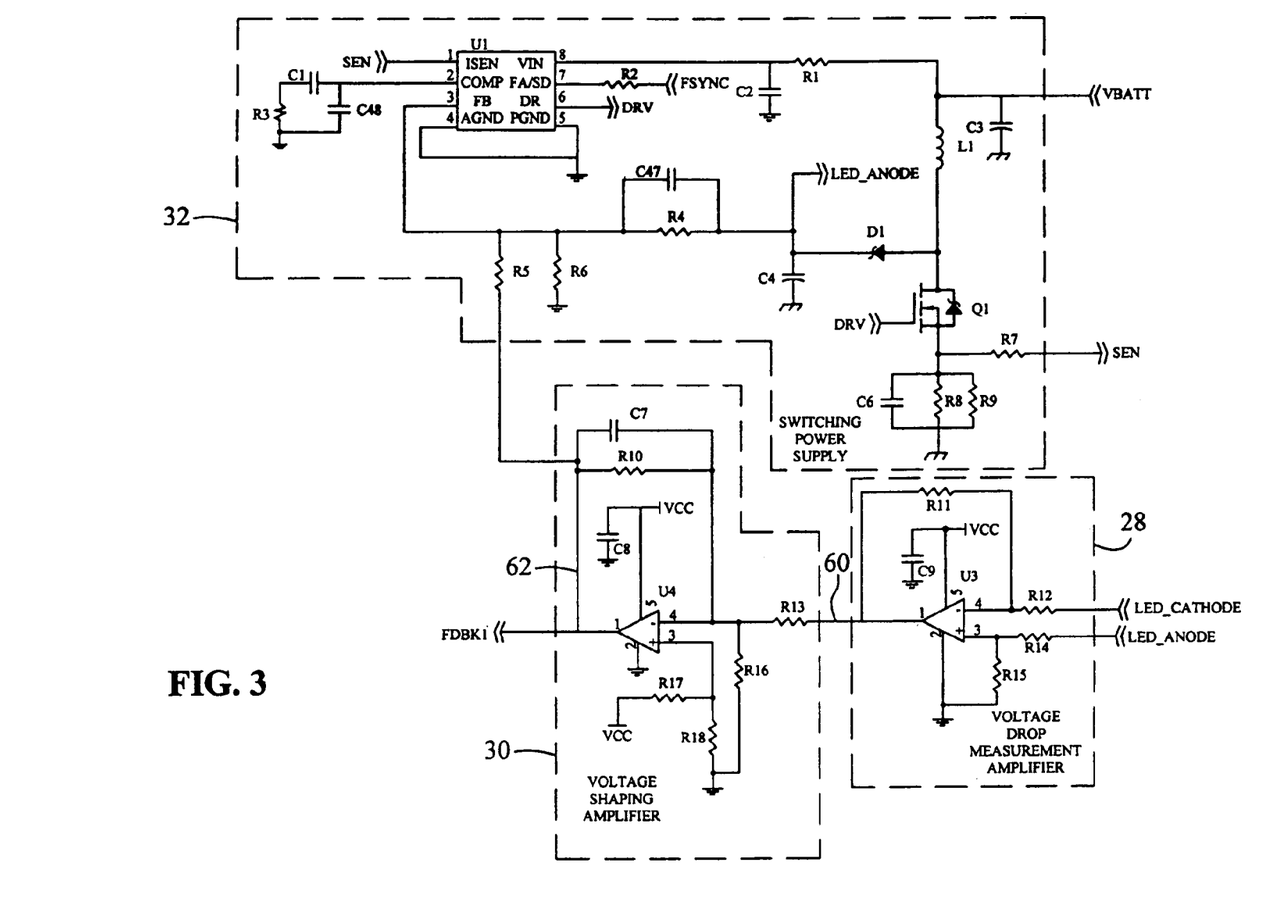
FIG. 3 is a schematic diagram of a first portion of the exemplary circuit shown in FIG. 1.

Referring to FIG. 3, portions of exemplary circuit 20 are shown, including exemplary schematic diagrams of switching power supply 32, voltage-shaping amplifier 30, and voltage drop measurement amplifier 28. Exemplary component values and part numbers for circuit 20 are listed in Table 1. Voltage drop measurement amplifier 28 measures device voltage 38, the voltage drop across LED 22, i.e., between the anode and cathode. Voltage drop measurement amplifier 28 may be, for example, a differential amplifier having sufficient common mode accuracy and voltage range to measure the actual voltage drop of LED 22 as it is being driven by current amplifier 26.

Exemplary voltage drop measurement amplifier 28 includes op amp U3 having a noninverting input coupled through resistor R14 to the anode of LED 22, and coupled to ground through resistor R15. The inverting input of op amp U3 is coupled through resistor R12 to the cathode of LED 22, and coupled to the output of op amp U3 through series resistor R11. The output of voltage drop measurement amplifier 28 provides device voltage signal 60 to the input of voltage-shaping amplifier 30.

Voltage-shaping amplifier 30 receives device voltage signal 60 from voltage drop measurement amplifier 28 and includes predetermined bias voltage 40 (FIG. 6). Predetermined bias voltage 40 is set by the voltage divider circuit of R17 and R18 and is supplied to the noninverting input of op amp U4 in order to regulate supply voltage signal 36, regulated by power supply 32, to a higher voltage level than that determined by device voltage signal 60 alone. Device voltage signal 60 is received by the inverting input of op amp U4 through series resistor R13 and across resistor R16 to ground. The inverting input of op amp U4 is also coupled to the output of op amp U4 by parallel capacitor C7 and resistor R10. The output of op amp U4 provides biased voltage signal 62 which is connected to switching power supply 32.

Voltage-shaping amplifier 30 of exemplary circuit 20 is configured as an inverting amplifier with predetermined bias voltage 40 (FIG. 6), which is coupled to the noninverting input of op amp U4, providing a positive bias that is overcome by device voltage signal 60 supplied to the inverting input of op amp U4. For exemplary circuit 20, a minimum device voltage 60 of 16.74 volts, labelled as signal 38 in FIG. 6, results in a maximum bias voltage signal 62, provided to regulate power supply 32, of approximately 4.85 volts and a supply voltage signal 36 of approximately 18.1 volts. A maximum device voltage signal 60 of 35.63 volts results in a minimum bias voltage signal 62 of approximately 0.15 volts and a supply voltage signal 36 of approximately 37.9 volts. The exemplary voltage values of exemplary circuit 20 represent the range of operation for LED 22, two arrays of LEDs. For example at approximately 2.0 amperes, the voltage drop between the anodes to cathodes across the LEDs is approximately 35.9 volts, thus giving a desired supply voltage signal 36 of approximately 37.9 volts when taking into account the approximately 2 volts of voltage loss to associated components and represented by predetermined bias voltage 40. Under the condition of a maximum battery voltage of approximately 16 volts, a supply voltage signal 36 of approximately 18.1 volts is the minimum for which power supply 32 can still boost and for which transistor Q2 (FIG. 4) is still dissipating an acceptable power level; however, at this level the current through LED 22 will typically be less than 100 milliamperes, which is below the useful operating range of LED 22.

Switching power supply 32 of exemplary circuit 20 includes various components for regulating supply voltage signal 36, which is delivered to the anode of LED 22. Exemplary components include PWM switching regulator controller U1, which is operated in a current mode to provide linear voltage regulation; resistors R4 and R5 which determine voltage gain; resistor R6 which determines the maximum voltage of supply voltage signal 36; inductor L1, zener diode D1, capacitor C4, and transistor Q1 which modulate the current through inductor L1 and therefore regulate supply voltage signal 36 supplied to the anode of LED 22; resistor R7 which senses the current modulated through inductor L1 for regulation by controller U1; and compensation capacitors C1, C2, C7, C47, C48, and resistor R3 which keep switching power supply 32 stable. Modulating transistor Q1 is driven by output pin 6 of controller U1.

Switching regulator controller U1 includes an internal reference voltage of approximately 1.25 volts at pin 3. The internal reference voltage is biased by bias voltage signal 62 provided through resistor R5 to regulate supply voltage signal 36 to the desired voltage level. The switching regulator controller U1 senses output voltage 36 of the supply via the feedback voltage at pin 3. It also senses the peak current flowing in inductor L1 using SEN, which measure across resistor R7 coupled to the source of transistor Q1. Controller U1 regulates the LED anode voltage by switching transistor Q1 on and off during the switching cycle interval. Transistor Q1 is switched on when the voltage at pin 3 is less than 1.25 volts except when the current exceeds the peak value determined by the SEN voltage, which is approximately 130 mV in the exemplary embodiment, and sense resistors R8 and R9. Transistor Q1 is turned on again at the next switching interval. When transistor Q1 is turned off, the current in inductor L1 commutates, due to voltage fly-back of inductor L1, and current flows via diode D1 into output capacitor C4. A portion of the energy stored in inductor L1 is transferred to capacitor C4 in each switching cycle. Transistor Q1 is turned on again at the beginning of the next switching cycle.

Switching regulator controller U1 actually varies the peak current sensed in response to the error voltage at pin 3 that in turn regulates output voltage 36 as a function of the LED current. To reduce LED current controller U1 effectively reduces the peak current sensed by its internal PWM mechanism. Current mode operation provides the most rapid transient response; however, implementation of current mode may vary with the vendor of switching controller IC. Alternatively, other switching controller ICs use the voltage mode alone and only the output voltage is sensed. Although exemplary circuit 20 utilizes current mode to regulate the voltage output, a voltage mode controller IC may be utilized, especial for continuous LED operation. Referring still to FIG. 3, switching power supply 32 is operated in an operational amplifier mode whereby the gain is determined by feedback resistor R4 over the voltage-shaping amplifier bias resistor R5. Because switching regulator controller U1 has an internal band gap reference of approximately 1.25 volts, the maximum output voltage of supply voltage signal 36 is equal to Vmax=1.25×(R4/(R6∥R5)+1). The operational gain of switching power supply 32 is equal to R4/R5. Essentially, switching power supply 32 acts as an inverting operational amplifier with an offset voltage of approximately 1.25 volts at its differential input. Typical switching power supply PWM regulator chips are generally not used in this manner since a fixed output voltage is the common usage. Proper compensation of switching power supply 32 is therefore critical. Though exemplary circuit 20 utilizes a current mode switching power supply, circuit 20 is not restricted to this type.

Figure 4:
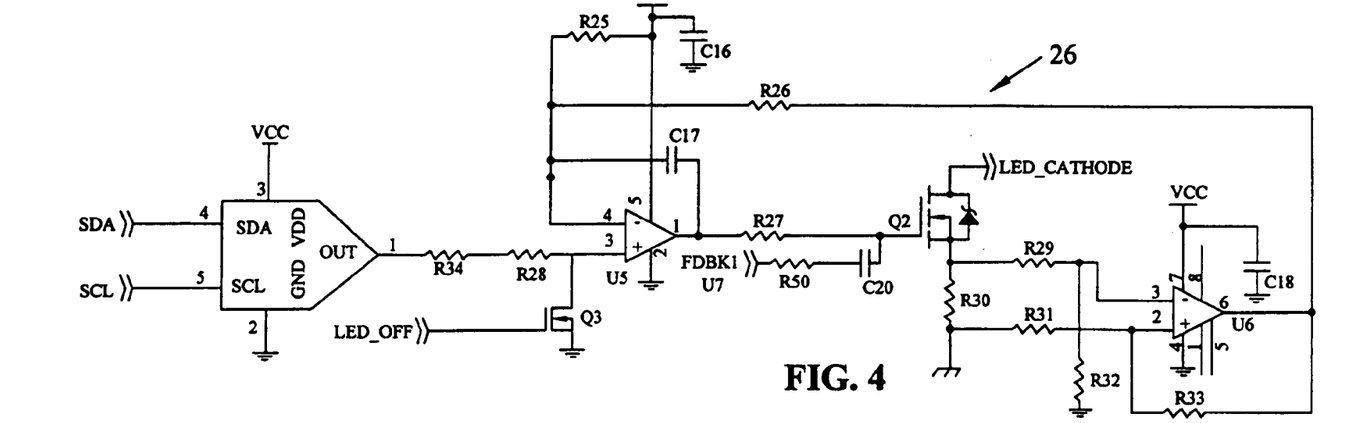
FIG. 4 is a schematic diagram of a second portion of the exemplary circuit shown in FIG. 1.

Current amplifier 26 of exemplary circuit 20 is shown in FIG. 4. Exemplary current amplifier 26 operates as a voltage follower having sense resistor 30 coupled with the source of transistor Q2. The drain of transistor Q2 is connected to the cathode of LED 22. The current flow through LED 22 is measured across sense resistor R30. Op amp U6 is configured as a differential amplifier and provides a voltage feedback signal through resistor R26 to the inverting input of op amp U5. Op amp U5 compares the feedback voltage to command signal 24, which is received through resistors R34 and R28 at the noninverting input of op amp U5. Command signal 24 may be received from, for example imaging control 48 (FIG. 2). Command signal 24 may be provided by digital to analog converter (DAC) U7 which converts a digital command signal to an analog voltage output, command signal 24.

Capacitor C17, connected across the inverting input of op amp U5 and the output of op amp U5, slews until the inverting and noninverting inputs of op amp U5 are balanced, i.e., the point at which the desired current determined by command signal 24 is flowing through LED 22 and detected at resistor R30. The output of op amp U5 is coupled through resistor R27 to the gate of transistor Q2, thus regulating the flow of current through LED 22. Current amplifier 26 may be turned off by providing a high signal to the gate of transistor Q3, pulling the noninverting input of op amp U5 low, while the inverting input of op amp U5 is coupled through resistor R25 to a positive voltage supply, therefore turning transistor Q2 off and interrupting current flow through LED 22. The regulation of supply voltage signal 36 provides voltage level to LED 22, and transistor Q2 and sense resistor R30, so that transistor Q2 may linearly control the current flow, i.e., operate outside the saturation region, and dissipate minimal power.

Figure 5:
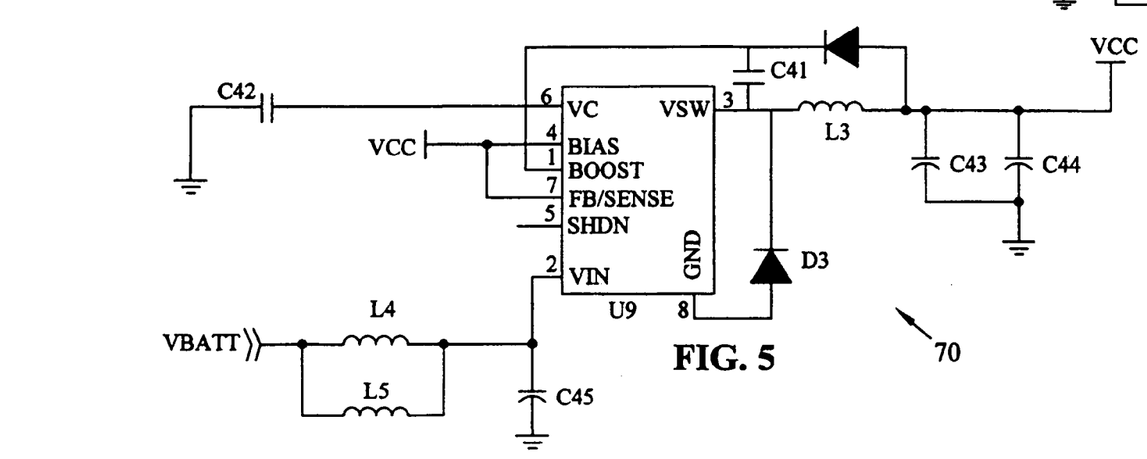
FIG. 5 is a schematic diagram of a third portion of the exemplary circuit shown in FIG. 1, including a power supply.

Referring to FIG. 5, voltage supply 70 is a typical voltage regulation circuit which in exemplary circuit 20 provides Vcc of 5 volts. However, the upper saturation of op amp U4 (FIG. 3) is directly dependent on the accuracy of the 5 volt supply voltage. The upper saturation of op amp U4 affects the minimum LED anode supply voltage.

FSYNC pin 1 is a particular feature of the controller IC selected for exemplary circuit 20. FSYNC allows the switching interval of the switching power supply IC to be controlled by an external frequency. Pin 7 of controller U1 is held low and the value of resistor R2 (FIG. 3) sets the frequency to approximately 300 kilohertz. SEN pin 1, in conjunction with R8 and R9 in parallel, senses the peak current in the inductor L1. FDBK1, which is connected from the output of op amp U4 to the gate of transistor Q2, is required to compensate for the drain capacitance of the drain of transistor Q2 because of the interaction of the dynamic voltage of power supply 32 and linear current amplifier 26.

Referring to FIG. 6, supply voltage signal 36 is a regulated voltage supplied by switching power supply 32 which is approximately equal to the sum of device voltage 38, i.e., the voltage drop across LED 22, and the additional voltage required for linear operation of current amplifier 26. The additional voltage may be fixed, for example, predetermined bias voltage 40 in exemplary circuit 20 is approximately 2 volts. Predetermined bias voltage 40 is approximately equal to the minimal voltage across current amplifier 26, specifically, transistor Q2 and resistor R30 (FIG. 4). The value of predetermined bias voltage 40 ensures linear current regulation through transistor Q2 and includes an additional voltage to accommodate slew rate limitations of switching power supply 32 and the tolerance of feedback resistors and the 5 volt supply voltage.

The combination of the band gap reference voltage, 5 volt supply voltage, and the resistors of FIG. 3 all contribute to the determination of output voltage 36. The resistors of voltage measurement amplifier 28 and the resistors directly connected to the feedback pin 3 of controller U1 significantly contribute to the determination of output voltage 36. Additionally, R13 and R10 of voltage shaping amplifier 30 also contribute to the determination of voltage 36. The sensitivity of these resistor tolerances varies as a function of the operating point on the curve shown in FIG. 6. At the maximum and minimum LED anode voltages, the switching supply output 36 is defined by the internal band gap voltage of controller U1, the saturation voltages of op amp U4, and resistors R3, R4, and R6. In between the maximum and minimum voltage limits, resistors R11, R12, R14, R15, R13, R16, R17, R18, and R10 control the slope. Additionally, there is an interaction between the upper saturation voltage of U4 and the intercept defined by R16, R17 and R18. This intercept occurs at the saturation voltage of op amp U4 (approximately 4.85 volts) when the voltage across LED 22 equals approximately 16.0 volts. For voltages greater then 16.0 volts the output of op amp U4 decreases as the voltage drop across LED 22 increases. At the maximum LED voltage drop of approximately 36 volts, the lower saturation voltage of approximately 0.15 volts is reached and the LED anode voltage is maximum.

Voltage-shaping amplifier 30 enables switching power supply 32 to provide power supply voltage signal 36 as shown in FIG. 6. Bias voltage signal 62, the output of voltage-shaping amplifier 30, saturates on both ends between ground and Vcc. Exemplary voltage-shaping amplifier 30 utilizes a rail to rail op amp U4. The two saturation levels of voltage-shaping amplifier 30 define the limits of the supply voltage signal 36. A maximum voltage of supply voltage signal 36 is set by the minimum output (ground) of voltage-shaping amplifier 30. Conversely, the minimum output of supply voltage signal 36 is set by Vcc saturation of voltage-shaping amplifier 30. The two voltage limits of switching power supply 32 are set by the feedback ratio and bias voltage signal provided by voltage-shaping amplifier 30, as shown in FIGS. 3 and 6.

If device voltage 38 across LED 22 is less than the minimum operating voltage (FIG. 6), then supply voltage signal 36 provided by switching power supply 32 is at a minimum because voltage-shaping amplifier 30, specifically op amp U4, is saturated at Vcc. If command supply voltage signal 36 is greater than the maximum voltage, then supply voltage signal 36 provided by switching power supply 32 is at the maximum voltage since voltage-shaping amplifier 30, specifically op amp U4, is saturated at ground.

Bias voltage signal 40 (FIG. 6) embedded in the scaling of the voltage shaping amplifier 30 should command a voltage for supply voltage signal 36 which is slightly more voltage than is needed in order to avoid linear amplifier 26 from saturating and resulting in no current regulation. In exemplary circuit 20, the voltage drop of linear amplifier 32 is regulated to approximately 2 volts (transistor Q2 drain voltage) for maximum current levels. Using precision resistor networks in voltage drop measurement amplifier 28, in voltage-shaping amplifier 30, and for feedback resistors R4, R5, and R6 of switching power supply 32 permits a lower predetermined bias voltage approaching the minimum voltage drop of transistor Q2, of approximately 0.5 volts. However, the accuracies of the internal band gap reference of switching regulator controller U2 and the 5 volt supply voltage remain limiting factors.

For exemplary circuit 20, peak power dissipation of linear amplifier 26 is approximately 2 volts multiplied by the commanded current totalling approximately 4 watts. If conventional unregulated power supply approaches are used, typical peak power dissipation of 20 watts or more results.

Supply voltage signal 36 may be scaled. In exemplary circuit 20, minimum voltage of supply voltage signal 36 is set by the minimum acceptable power dissipation of current amplifier 26 at low current operation. At this point, voltage of linear amplifier 26 equals the minimum voltage of supply voltage signal 36 provided by switching power supply 32. In exemplary circuit 20, low current operation is less than approximately 0.1 amps, resulting in power dissipation of approximately 1.8 watts. In exemplary circuit 20, the maximum voltage for supply voltage signal 36 is set by the maximum device voltage 38, the maximum voltage drop of LED 22 at maximum commanded current. In exemplary circuit 20, maximum supply voltage signal 36 is approximately 38 volts for two arrays of LEDs in series and a commanded current of 2 amps.

For the application described for imaging system 41, shown in FIG. 2, exemplary circuit 20 does not continuously drive LED 22; therefore, current amplifier 26 is periodically turned off at transistor Q3 (FIG. 4). Referring to FIG. 3, switching power supply 36 includes storage capacitor C4 which "parks" supply voltage signal 36 based on the last commanded voltage. Upon current amplifier 26 being turned off, switching power supply 32 is unloaded. Advantageously, parking supply voltage signal 36 at the last commanded voltage minimizes the rise time of supply voltage signal 36 and minimizes or eliminates the impact of the slew rates of switching power supply 32. Therefore, the power dissipation of linear amplifier 26 may be less than calculated above since linear amplifier 26 is initially saturated while settling to the current flow commanded by command signal 24. Additionally, parking supply voltage signal 36 between periods of driving LED 22 prevents excessive peaking of the LED current because switching power supply 32 is initially unloaded and droops slightly when current amplifier 26 is again turned on. As a result, the initial current flow through LED 22 is very close to that commanded by command signal 24.

Figure 7:
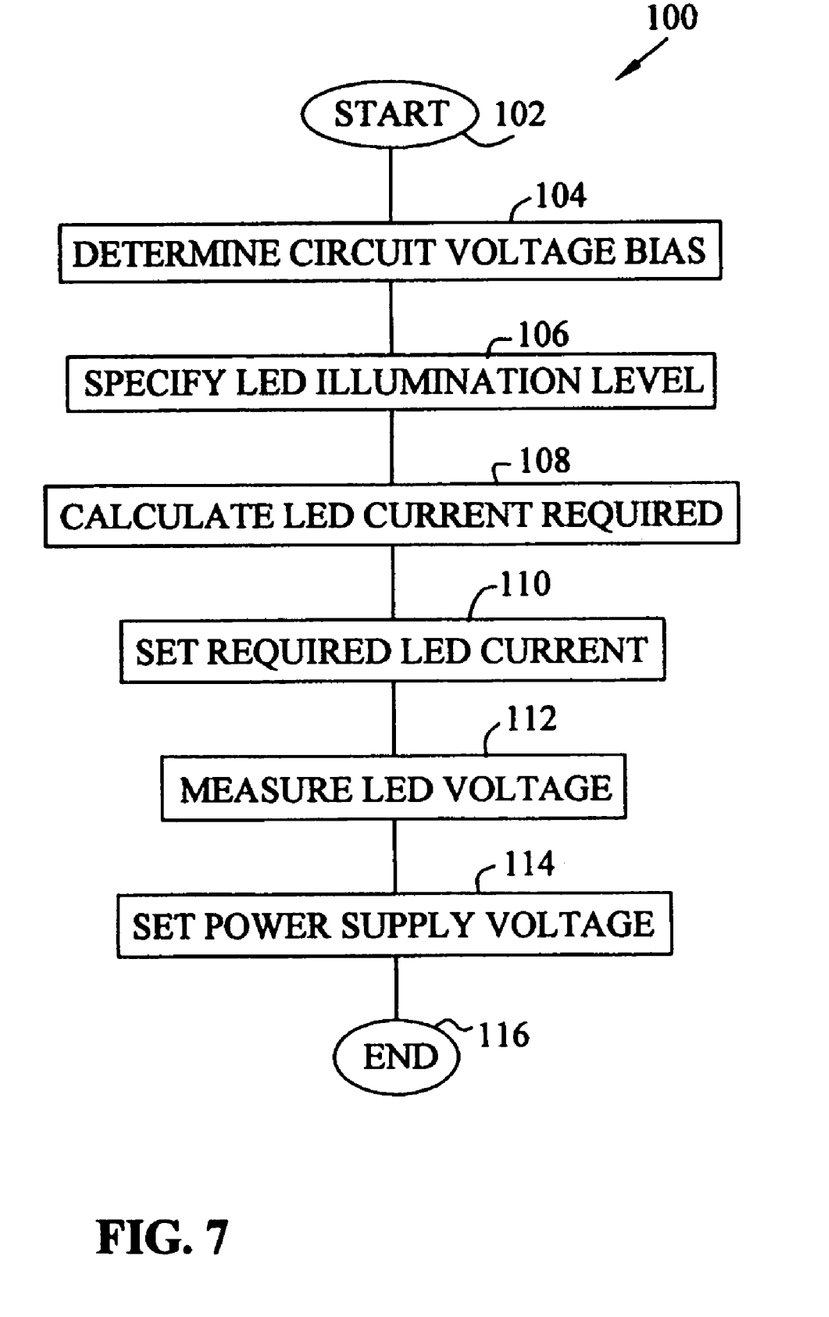
FIG. 7 is a flowchart illustrating the steps of a method for controlling LEDs according to the present invention.

Referring to FIG. 7, a method for controlling the current flow through an electrical device while minimizing power dissipation due to the current regulation is illustrated. For purposes of illustration, method 100 shown in FIG. 7 will be described as implemented by exemplary circuit 20; however, the steps of method 100 may be implemented using other hardware and/or software embodiments. For example, an exemplary embodiment may include a microprocessor receiving command signal 24 and having software for determining output signals utilizing an analog to digital converter and digital to analog converters to drive a linear current amplifier and voltage supply regulator.

Method 100 starts in step 102. In step 104, a circuit voltage bias is determined. In exemplary circuit 20, voltage-shaping amplifier 30 includes fixed predetermined bias voltage 40 which is determined as discussed above.

In step 106, an LED illumination level is specified, specifically command signal 24 is provided to current amplifier 26.

In step 108, the current flow through LED 22 which provides the specified illumination level is determined. Specifically, current amplifier 26 linearly regulates current flow through LED 22 based on command signal 24 received by DAC U7.

In step 110, the required current flow through LED 22 is set. Specifically, current amplifier 26 measures the current flow through LED 22 at sense resistor R30 and uses a voltage follower configuration of op amps U5 and U6 and related components to regulate current flow at transistor Q2.

In step 112, the voltage drop across LED 22 is measured. Specifically, voltage drop measurement amplifier 28 measures the voltage difference between the cathode and anode of LED 22.

In step 114, the power supply voltage supplied to LED 22 is set. Specifically, switching power supply 32 receives bias voltage signal 62 from voltage-shaping amplifier 30 and voltage drop measurement amplifier 28 in order to linearly regulate supply voltage signal 36 provided to the anode of LED 22. In step 116, method 100 is complete.

Below is a table listing exemplary component values for FIGS. 3–5.

TABLE 1

| | |
|---|---|
| C1 | 22 nF |
| C16 | 0.1 µF |
| C17 | 2200 pF |
| C18 | 0.1 µF |
| C2 | 0.1 µF |
| C20 | 0.047 uF |
| C3 | 100 µF |
| C4 | 220 µF |
| C41 | 0.1 µF |
| C42 | 3300 pF |
| C43 | 47 µF |
| C44 | 47 µF |
| C45 | 10 µF |
| C46 | 100 pF |
| C47 | 0 pF |
| C6 | 0.01 µF |
| C7 | 0 pF |
| C8 | 0.1 µF |
| C9 | 0.1 µF |
| D1 | 1N5822 |
| D2 | MBR0540T3 |
| D3 | RB160L-40 |
| L1 | 10 µH |
| L4 | 120 nH |
| L5 | 120 nH |
| Q1 | IRLZ44N/TO |
| Q2 | IRLZ44N/TO |
| Q3 | BS170F/SOT |
| R1 | 20 |
| R10 | 10K |
| R11 | 10K 0.1% |
| R12 | 100K 0.1% |
| R13 | 4.02K |
| R14 | 100K 0.1% |
| R15 | 10K 0.1% |
| R16 | 2.67K |
| R17 | 10K |
| R18 | 3.32K |
| R2 | 30K |

TABLE 1-continued

| | |
|---|---|
| R25 | 5.1M |
| R26 | 316K |
| R27 | 1K |
| R28 | 301K |
| R29 | 10K |
| R3 | 4.7K |
| R30 | 0.0449 2 W |
| R31 | 10K |
| R32 | 392K |
| R33 | 392K |
| R4 | 46.4K 0.1% |
| R5 | 1.0K |
| R50 | 1.0K |
| R6 | 1.81K 0.1% |
| R7 | 0.0 |
| R8 | 0.0665 2 W |
| R9 | 0.0665 2 W |
| U1 | LM3488 |
| U3 | LM7301 |
| U4 | LM7301 |
| U5 | LM7301 |
| U6 | AD8551 |
| U7 | MAX5381 |
| U9 | LT1376-5 |
| LED 1 | OTLH-0070-IR |
| LED 2 | OTLH-0070-IR |

Although described in the exemplary embodiments, it will be understood that various modifications may be made to the subject matter without departing from the intended and proper scope of the invention. Accordingly, it will be understood that other embodiments may fall within the scope of this invention, which is defined by the appended claims.

The invention claimed is:

1. A circuit for powering a device based on a command signal, comprising:
   a voltage measurement device adapted to provide a device voltage measured across the device;
   a current amplifier receiving the command signal and connected to the device, said current amplifier capable of linearly regulating current flowing through the device; and
   a power supply having a supply voltage signal connected to the device, said supply voltage signal being regulated by said power supply based on said voltage measurement device,
   wherein said voltage measurement device is coupled to said current amplifier and said power supply and power dissipation in said current amplifier is minimized by varying said supply voltage signal based on said voltage measurement device, and
   wherein said voltage measurement device further comprises a voltage biasing circuit receiving said device voltage and providing a biased voltage signal to a control input of said power supply, said biased voltage signal set by said voltage biasing circuit such that said supply voltage signal produced by said power supply is regulated to approximately equal said device voltage plus a predetermined bias voltage.

2. The circuit of claim 1, wherein said predetermined bias voltage is determined based on approximately the minimum supply voltage signal required at the maximum command signal to avoid saturation of said current amplifier, thereby providing linear operation while minimizing power dissipation.

3. The circuit of claim 1, wherein said current amplifier is adapted to terminate current flow through the device, thereby temporarily disabling the device.

4. The circuit of claim 3, wherein said current amplifier includes a transistor having at least one of a source and a drain connected to said device.

5. The circuit of claim 4, wherein:
said current amplifier includes a current sensing device coupled to at least one of the device and said transistor; and
said current amplifier includes a voltage follower coupled between said current sensing device and a gate of said transistor.

6. The circuit of claim 1, wherein said power supply includes a pulse-width modulated switching power supply configured to operate as a linearly adjustable voltage supply.

7. The circuit of claim 1, wherein said voltage biasing circuit includes a differential amplifier receiving said device voltage and a signal based on said predetermined bias voltage.

8. A circuit, comprising:
an LED;
a voltage regulator providing a supply voltage signal to said LED; and
a current amplifier connected to said LED and capable of linearly regulating current flowing through said LED,
wherein said current amplifier includes a transistor coupled to said LED,
wherein said voltage regulator is adapted to adjust said supply voltage for a given current flow so that said supply voltage signal enables said transistor to operate linearly while allowing for power dissipation of said transistor to be minimized, and
wherein said supply voltage is approximately equal to the voltage across said LED plus a predetermined bias voltage.

9. The circuit of claim 8, further comprising a differential amplifier connected to said power supply, said differential amplifier determining at least one of said predetermined bias voltage and the voltage across said LED.

10. An illumination control for an imaging system, comprising:
an illumination source;
a controller providing a command signal based on a desired illumination level;
an illumination control circuit having a current amplifier receiving said command signal and coupled to said illumination source, said current amplifier linearly controlling current flowing through said illumination source based on said command signal;
a power supply providing a supply voltage to said illumination source; and
a voltage biasing circuit for setting a predetermined bias voltage and a voltage measuring circuit capable of measuring the voltage across said illumination source, said voltage measuring circuit coupled to said illumination source and said voltage biasing circuit coupled to said voltage measuring circuit and at least one of said power supply and said current amplifier, said supply voltage being regulated to approximately the sum of said predetermined bias voltage and the voltage measured by said voltage measuring circuit.

11. The illumination control of claim 10, wherein said power supply linearly regulates said supply voltage to provide sufficient supply voltage to not saturate said current amplifier while minimizing excess power dissipation.

12. The illumination control of claim 10, wherein said illumination source includes an LED.

13. A method of controlling an LED, comprising the steps of:
determining an illumination level;
determining the current flow through the LED necessary to provide the illumination level;
limiting the current flow through the LED to the determined level;
determining a bias voltage;
determining the voltage across the LED at the determined current flow; and
providing to the LED approximately the sum of the bias voltage and the voltage across the LED.

* * * * *